Nov. 16, 1954　　　　　　　A. K. ANANDER　　　　　　　2,694,337
FLEXIBLE SHEET SUPPORT FOR CAMERAS
Filed July 31, 1951

INVENTOR,
ANDREW K. ANANDER
BY
Morgan, Finnegan + Durham
ATTORNEYS.

Nov. 16, 1954
A. K. ANANDER
2,694,337
FLEXIBLE SHEET SUPPORT FOR CAMERAS
Filed July 31, 1951
2 Sheets-Sheet 2
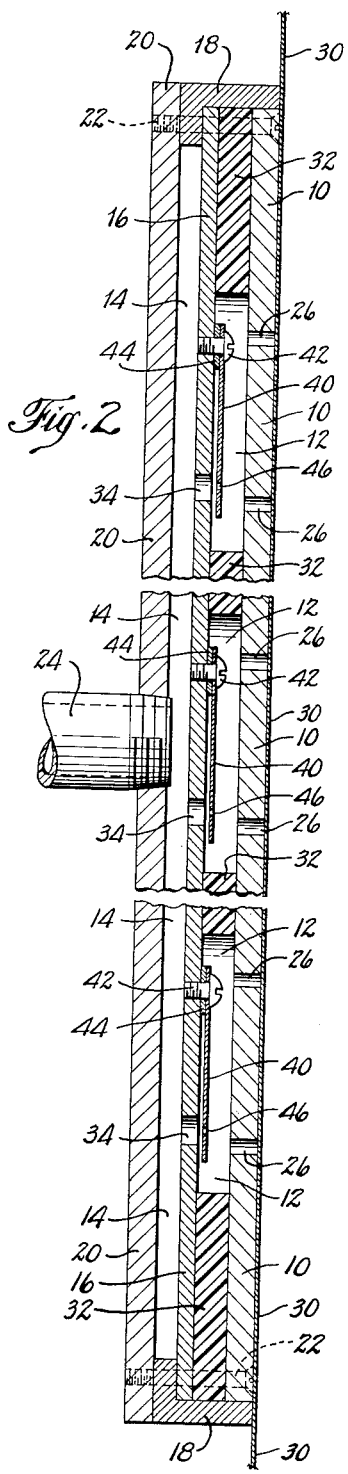
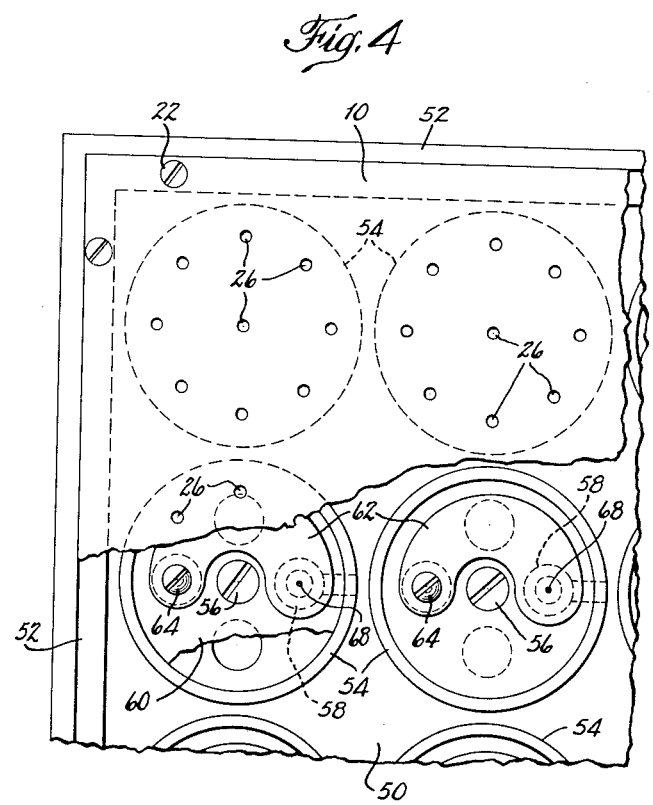
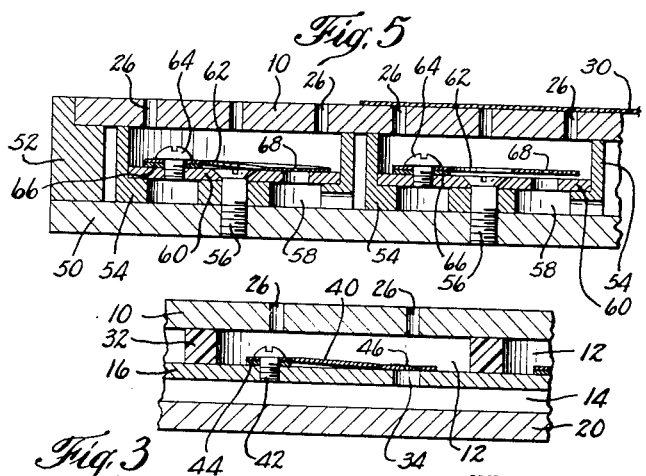
INVENTOR,
ANDREW K. ANANDER
BY
Morgan, Finnegan & Durham
ATTORNEYS.

United States Patent Office
2,694,337
Patented Nov. 16, 1954

2,694,337

FLEXIBLE SHEET SUPPORT FOR CAMERAS

Andrew K. Anander, Glen Cove, N. Y., assignor to Powers Chemco, Inc., Glen Cove, N. Y., a corporation of New York Application July 31, 1951, Serial No. 239,575

7 Claims. (Cl. 88—24)

The present invention relates to a novel and improved flexible sheet support to form part of a precision camera, such as a photoengraving camera.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate two embodiments of the invention, and together with the description, serve to explain the principles of the invention.

In the drawings:

Fig. 2 is a broken-away vertical section taken on the line 2—2 of Fig. 1.

Fig. 3 is a fragmentary section showing one of the valve members in closed position, while Fig. 2 shows the valves in open position.

Fig. 4 is a fragmentary plan view of a modified embodiment of the invention.

Fig. 5 is a fragmentary sectional view of the form shown in Fig. 4.

Figure 1:
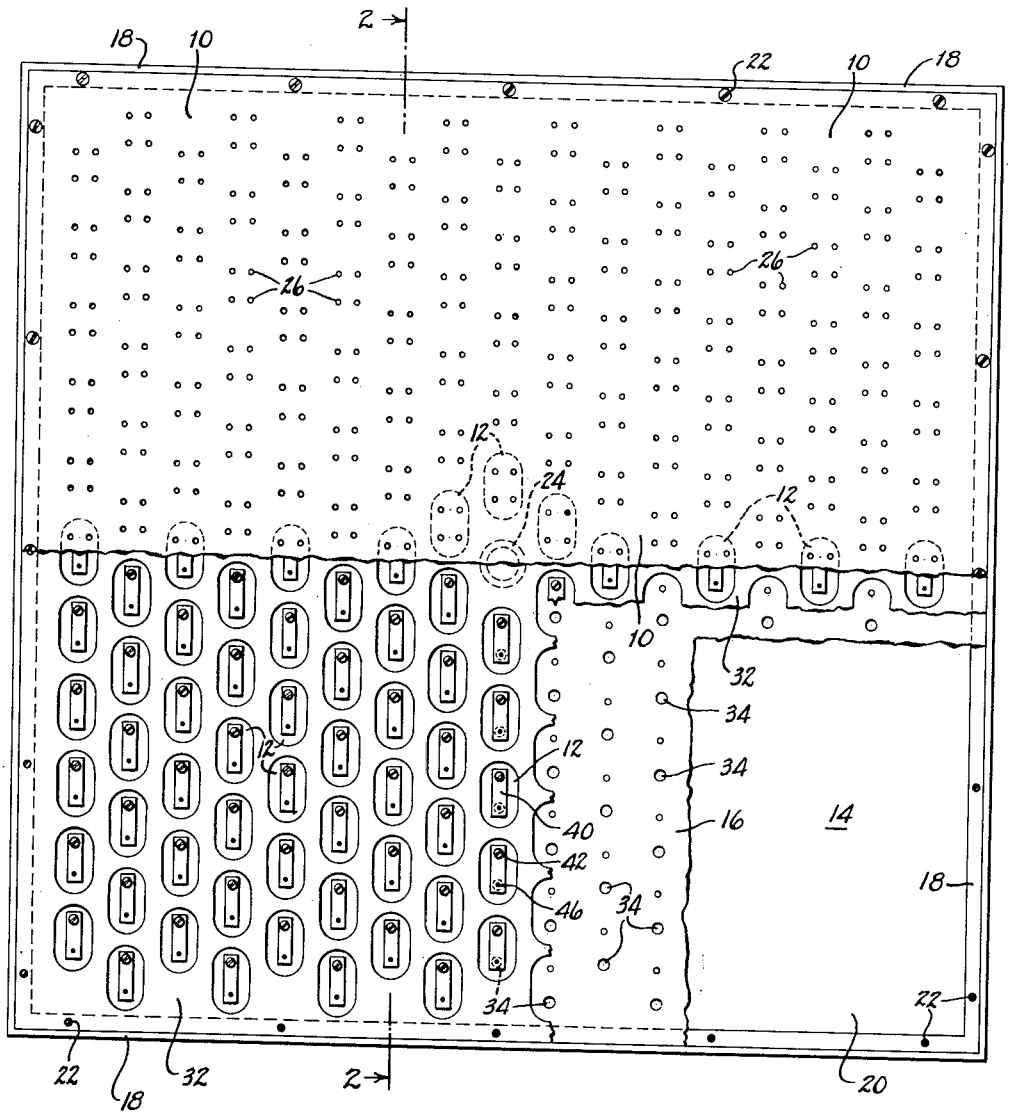
Fig. 1 is a front plan view of a typical and preferred embodiment of the invention as adapted for use as a support for sensitive sheet material in a photoengraving camera, certain parts being broken away to show the underlying parts.

The present invention relates to camera backs and other photographic support members, such as easels and copyboards for cameras and enlargers and the supports for the sensitized film where precision requires the use of a vacuum support member for insuring substantial flatness of a sheet of film or other material, such as the copy or enlarging paper.

The present invention has for its object the provision of a photographic supporting member for flexible sheet material which can be used indiscriminately with various widths or sizes of material, and which will hold the material flat with a small capacity suction pump. A further object is the provision of a suction operated photographic support in which the flow of air is substantially reduced through any apertures in the support which are not covered by the flexible sheet to be supported at the same time that the suction is not at all diminished on the flexible sheet. Still another object is the provision of a support to receive and hold flat various widths of photographic film by means of suction applied to the back of the film and with means for reducing the wasted suction at those portions of the support which are not covered by film. The invention thus provides a support for widely varying widths of film or copy in the photographic process, insuring overall focus for the supported member while avoiding the use of suction pumps of unusually large capacity.

In accordance with the present invention, the support is provided with a foraminated face to which suction is applied to hold flat and firm a flexible sheet, which may be photographic film, photographic paper, strip film, camera copy or other flexible sheet material used in photography. The foraminated face is subdivided into a plurality of sections, each of which is less than about 5% of the total area of the face, and these several areas are connected to a suction pump by means of normally open resiliently actuated valves which are moved to restrictive position by the absence of material overlying the section of the face. In those sections of the face which are covered by a flexible sheet or film or other material, the restrictive valves are fully open so that the full suction is applied to the back of the sheet or film, while in those sections which are not completely covered by the sheet or film, the restrictive valves are moved by the suction to restrictive position, thereby conserving the capacity of the suction pump and insuring that the full area of the sensitized sheet or film is securely and firmly held against the face of the supporting member.

As embodied, each of the sections is provided with a restrictive valve comprising a resiliently opened member provided with means for passing a small amount of air through it and overlying a relatively large aperture in the backing member through which air is removed by the suction pump. The restrictive valve in each section communicates with a plurality of small apertures on the face of the support and controls is controlled by the air flowing through the small apertures as it is led to the suction pump through the large aperture underlying the restrictive valve.

In certain respects the present invention is an improvement on the process cameras disclosed in the patents to Frank T. Powers, No. 2,282,427, granted May 12, 1942, and No. 2,287,271, issued June 23, 1942, but in other respects the invention is of more general application and is adapted to supporting many types of flexible sheet material which must be held flat in the photographic process.

Heretofore, cameras, enlarging easels and copy holders have been provided with vacuum or suction means for securing and firmly holding flat a sheet of material used in the photographic process, and in certain instances, the supporting member provided with suction ports has been divided into fixed zones which could be controlled by a series of manually actuated valves so that only by proper manipulation of the valves, suction was applied to the major portion of the back of the flexible sheet, and the apertures in those portions of the support which were not covered by the flexible sheet could, in many instances, be shut off from communication with the suction pump so that the full force of the suction pump could be applied to the back of the flexible sheet. However, such devices have required considerable manipulation and judgment to be exercised on each change in the size of the supported sheet, have unduly complicated and rendered bulky the expedients used for carrying out these functions and have not met with too much favor in the trade due to their cost and complexity. By the present invention, the necessity for adjustment and manipulation are avoided, and no cumbersome, costly or complex devices are required for insuring that the suction area is limited to the area of the flexible sheet on the supporting member.

It will be understood that the foregoing general description and the following detailed description as well are exemplary and explanatory of the invention but are not restrictive thereof.

Referring now in detail to the present preferred and illustrative embodiment of the present invention as shown in the accompanying drawings, there is shown a photographic support suitable for use as a supporting back for flexible sensitized sheet material, such as photographic film, paper or strip-film, as a support for camera copy or as an enlarging easel to hold the photographic paper on which the enlargement is to be made. As embodied, there is provided a flat rigid support 10 of larger dimensions than the largest flexible sheet to be held, and of sufficient thickness so that its surface remains sufficiently flat for the purpose of holding the flexible sheet material in proper focus. Preferably, the rigid support 10 is formed of rigid plastic material with its exposed face of a relative dark or black color. Figs. 1, 2 and 3 illustrate the preferred form of the invention which is particularly adapted to be used as the strip-film supporting member in a "Chemco" vacuum back photoengraving camera.

The space behind the rigid backing sheet or support 10 is divided into two relatively thin spaces 12 and 14, extending over substantially the entire back area of the support 10, and for this purpose a solid rigid sheet 16 is provided of the same size as the support 10 and is spaced therefrom by means of the angle members 18 forming an air-tight border and spacing member between the sheets 10 and 16, while an apertured intermediate sheet 20 is provided between the sheets 10 and 16 and is spaced from the back sheet 16 by the angle members 18. The sheets 10, 16 and 20 and the angle members 18 are assembled in air-tight relation by means of the screws 22 which pass through the sheets 10 and 20 and the angle members 18, and are threaded into the back sheet 16.

Suction is applied to the support for holding the flexible material firmly on the backing sheet 10 by means of a suction connection 24 which is connected to a suitable suction pump, and projects rearwardly from a central portion of the back sheet 20 to communicate with the space 14.

Support 10 is provided with a large number of small apertures 26 which are preferably arranged in small groups and are distributed over the major portion or all of the usable surface of the support 10 to form the suction members by which the flexible sheet 30 to be supported is firmly gripped and caused to adhere in a flat condition to the surface of the sheet member 10.

The small apertures 26 are divided into relatively small groups, each comprising only a few of the adjacent apertures 26, by means of division members 32 which close the space between the sheets 10 and 16 and thus divide this space 12 into a considerable number of small areas 32 each of which is supplied with suction from the pipe 24 and the space 14 by means of a relatively large aperture 34 formed in the sheet 16. Thus the space 14 serves as a distribution manifold to apply suction from the pipe 24 to all of the apertures 34 each of which applies the suction to the small areas 32 and thereby to each corresponding small group of apertures 26 which may be covered with the sheet 30.

Restrictive valve means are provided for reducing the flow of air through each of the section ports or apertures 34 whenever one or more of the small apertures 26 communicating with it is not covered by the flexible sheet 30, thereby reducing the required capacity of the pump which applies suction to the pipe 24 and manifold space 14, and increasing the suction which is usefully applied to the groups of small apertures 26 which are covered by the flexible film or paper 30.

As embodied, each such restrictive valve comprises a resiliently mounted member adapted to substantially reduce the effective area of the port or aperture 34, the resilient member being normally biassed to open or non-obstructing position and being readily moved to closed or restrictive position by an abnormally large flow of air through the adjacent port 34, such as might be caused by one of the small apertures 26 not being covered by the flexible film or paper 30.

Preferably, each restrictive valve member comprises a leaf spring 40 mounted on the sheet 16 by means of a screw 42 and normally biased to be slightly spaced at its outer end from the sheet 16 and also preferably spaced by means of a relatively thin spacing washer 44. The outer end of the spring member 40 overlies the relatively large aperture 34, and this outer end is preferably provided with a relatively fine aperture 46 which is adapted to register with the aperture 34 thereby greatly reducing the flow of air through the aperture 34. Thus when an abnormally large flow of air through the aperture 34 occurs, the leaf spring member 40 is drawn towards the sheet 16 and into firm contact with the edges of the aperture 34 thereby placing the fine aperture 46 in register with the larger aperture 34 so as to greatly reduce the flow of air and thereby conserve the capacity of the suction pump.

In Fig. 2, the several leaf spring members are shown in their normal position which they occupy when no suction is applied through the supply pipe 24, or when all of the corresponding apertures 26 are covered by the supported flexible sheet 30. Fig. 3, on the other hand, shows the several apertures 26 of one group when they are not covered by a flexible supported sheet 30 and with suction applied to the large aperture 34. In this case, the leaf spring member 40 has been drawn down into contact with the sheet 16 so that aperture 34 is closed except for the fine aperture 46 which registers therewith.

In many cases it will be found that the restrictive aperture 46 is not needed, but more reliable operation of the restrictive valves is assured by the provision of some such means. Where the restrictive apertures 46 are omitted, it is essential that firm and uniform initial contact of the flexible sheet 30 to be supported be assured, as any lack of firm contact of the sheet 30 with the face of support 10 might result in certain of the apertures 26 leaking air to an extent sufficient to cause the restrictive leaf members 40 to seat closing the apertures 34 and thereby depriving the apertures 26 of suction which should be applied to them. When such apertures 46 are employed, slight buckling of the film or paper 30 or other imperfect closure of the apertures 26 does not prevent establishment of good suction. Even if the leaf spring member 40 is moved to restrictive position, suction is continued at a reduced rate and eventually pulls the flexible film or sheet 30 into the desired firm contact with the face of the support 10.

The present invention facilitates removal of the flexible film or sheet 30 from the surface of the support 10, even if suction is continued to be applied through the pipe 24. As the film or paper is peeled or otherwise lifted from the surface of the support 10, the suction applied to each group of apertures 26 is reduced as soon as one of the apertures 26 is uncovered. When all of the sheet 30 has been removed from the support 10, the restrictive valves then operate to reduce the duty imposed on the suction pump and leave the suction system ready to reestablish the desired degree of suction when a new sheet of film or sensitive material or other flexible member is positioned over the face of the support 10.

While the relative sizes of the apertures 26, 34 and 46 may be widely varied, the area of each aperture 34 is preferably greater than the total area of the small apertures 26 communicating with it and forming a group, while the area of the aperture 46 is preferably considerably smaller than the area of any one of the apertures 26. In actual practice, it has been found that the restrictive aperture 46 is satisfactory when made by a #60 drill (0.040"), the apertures 26 being made with a #40 drill (0.098") and the aperture 34 being made with a #12 drill (0.189"), and with four to six apertures 26 being in communication with each aperture 34.

Figs. 4 and 5 illustrate a modified embodiment of the invention in which each restrictive valve is formed as a unit with a suction port and also includes means to divide the small apertures on the support 10 into the desired groups. As embodied, the support 10 is a flat rigid member as previously described, but is preferably provided with a larger group of small suction apertures 26 to be closed by the supported sheet of film or paper 30. Each group conveniently comprises a central aperture surrounded by as many as eight similar apertures arranged in a circular series, the several groups of apertures being closely adjacent so that the useful area of the supporting surface 10 is uniformly provided with such apertures and groups.

The supporting surface is securely mounted in an air-tight manner in a recessed frame comprising a backing member 50 having an upstanding marginal spacing portion 52 which spaces the backing member 50 from the support 10 and forms an air-tight space between them so that the full suction may be applied from a suitable pipe 24 to the small apertures 26.

Within the space between members 10 and 50 and in substantially air-tight relation with the back of member 10 are recessed cup-like members 54 each of which is secured to the backing member 50 by means of a screw 56 with the rim in engagement with the back of member 10 and the recessed portion forming a manifold for a group of the small apertures 26. The bottom of each cup-like member 54 is apertured, as at 58, and communicates with a lateral aperture into the main body of the space between the members 10 and 50 so that suction is applied through the apertures 58 and may be applied to the apertures 26. In the bottom of each cup member 54 is seated a restrictive valve unit which is preferably removable as a unit and is normally held in position by means of the screw 56. This restrictive valve unit comprises a plate member 60 of sufficient size to overlie the aperture 58 and preferably to cover the entire bottom area of the recess in the cup-like member 54. On the plate member 60 is mounted a light resilient leaf spring member 62 by means of a mounting screw 64 and a spacing washer 66, the mounting screw 64 being spaced as far as practical from the aperture and the length of the leaf spring member 62 being further increased by forming it as a curved member. On the free end of the leaf spring member 62, and in a position where it is adapted to register with the aperture 58, the spring member 62 is provided with the fine restrictive aperture 68.

In operation, the embodiment of Figs. 4 and 5 is substantially identical with that of Figs. 1, 2 and 3. When a sheet of flexible film or paper 30 has been positioned over all or a portion on the useful surface of the support 10, and suction is applied, the sheet or film 30 is drawn into firm and uniform contract with the front surface of the support 10 by the suction applied to the back of the film or sheet 30 through the apertures 26 (as shown at the right of Fig. 5), while at those portions where some or all of the apertures 26 of a group are not so covered, the restrictive valve member 62 operates to restrict the flow of air through the port 58 (as shown at the left of Fig. 5).

The invention in its broader aspects is not limited to the specific mechanisms shown and described but departures may be made therefrom, within the scope of the accompanying claims, without departing from the principles of the invention and without sacrificing its chief advantages.

What is claimed is:

1. In a photographic camera, the combination of a backing member for supporting a flexible sheet of photosensitive material in firm, intimate contact with the backing member, said backing member being provided with a plurality of apertures distributed over its surface through which suction may be applied to the back of the supported flexible sheet, means dividing said apertures into a plurality of groups each group comprising a plurality of adjacent apertures, a suction means, and valve means for each group of apertures and regulating the application of suction to the apertures of the group, each of said valve means comprising a relatively large suction aperture, a normally open resilient member restricting said suction aperture when the group of communicating apertures is not closed by the flexible supported sheet, said resilient member being of such resilience that it springs open and leaves the suction aperture substantially unobstructed when the group of apertures are closed by the flexible supported sheet, and a small passage in communication with said suction aperture and said communicating apertures when said resilient member is restricting said suction aperture.

2. A photographic camera as claimed in claim 1 in which the resilient member is apertured and normally spaced from the large suction aperture and adapted to restrict the large suction aperture when the small apertures are not covered by the flexible supported sheet, the aperture of said resilient member being only a small fraction of the size of said suction aperture and overlying said suction aperture in registry therewith.

3. A photographic camera as claimed in claim 2 in which the large suction aperture has an area at least as large as the sum of the areas of the small apertures of the group, and the resiliently mounted apertured member is normally spaced from the large aperture and its aperture overlies and registers with the large aperture in restricting position, the aperture of the resiliently mounted member being no larger than a single one of the small apertures of the group.

4. A photographic camera as claimed in claim 2 in which the resiliently mounted apertured member comprises a light leaf spring having a small aperture adapted to register with the large suction aperture.

5. In a photographic camera, the combination of a backing member for supporting a flexible sheet of photosensitive material in firm, intimate contact with the backing member; said backing member being provided with a large number of apertures distributed over its surface through which suction may be applied to the back of the supported flexible sheet, a suction means, a plurality of valve means each controlling the application of suction to one or more of the apertures, each of said valve means comprising a relatively large suction aperture; a normally open resilient spaced apertured member adapted to register with and restrict the large suction aperture when the flow of air through the suction aperture exceeds a normal value, whereby the suction aperture is restricted only when the corresponding small aperture in the backing member is covered by a flexible sheet supported on the back, the aperture of said resilient member being only a small fraction of the size of said suction aperture and overlying said suction aperture in registry therewith.

6. A photographic camera as claimed in claim 5 in which each resiliently mounted apertured member comprises a light leaf spring having a small aperture normally spaced from but adapted to register in restricting position with the large suction aperture.

7. A photographic camera as claimed in claim 5 in which the large suction apertures are formed in a member spaced from and parallel to the backing member, means are provided for dividing the intervening space into sections each of which includes only one suction aperture, and a restricting member is provided in each section.

References Cited in the file of this patent

UNITED STATES PATENTS

| Number | Name | Date |
|---|---|---|
| 627,069 | Baker | June 13, 1899 |
| 661,840 | Baker | Nov. 13, 1900 |
| 1,813,689 | Weisker | July 7, 1931 |
| 2,217,380 | Pedder | Oct. 8, 1940 |
| 2,379,279 | Costello | June 26, 1945 |
| 2,425,921 | Crockett | Aug. 19, 1947 |